United States Patent
Sasaki et al.

(10) Patent No.: US 6,717,642 B2
(45) Date of Patent: Apr. 6, 2004

(54) WIDE VIEWING ANGLE POLARIZER AND LIQUID-CRYSTAL DISPLAY DEVICE

(75) Inventors: Shinichi Sasaki, Ibaraki (JP); Takashi Yamaoka, Ibaraki (JP); Nao Murakami, Ibaraki (JP); Hiroyuki Yoshimi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/266,943

(22) Filed: Oct. 9, 2002

(65) Prior Publication Data

US 2003/0103186 A1 Jun. 5, 2003

(30) Foreign Application Priority Data

Oct. 10, 2001 (JP) ..................... P2001-312162

(51) Int. Cl.⁷ ........................................... G02F 1/1335
(52) U.S. Cl. ....................... 349/118; 349/119
(58) Field of Search ................. 349/117, 118, 349/119, 96, 115

(56) References Cited

U.S. PATENT DOCUMENTS

| | | | |
|---|---|---|---|
| 5,737,047 A | * | 4/1998 | Sakamoto et al. ........... 349/119 |
| 6,380,996 B1 | * | 4/2002 | Yokoyama et al. ......... 349/117 |
| 6,476,892 B2 | * | 11/2002 | Aminaka .................... 349/117 |
| 6,606,140 B1 | * | 8/2003 | Ito et al. ..................... 349/123 |

FOREIGN PATENT DOCUMENTS

| | | |
|---|---|---|
| JP | 03-009325 | 1/1991 |
| JP | 03-067219 | 3/1991 |
| JP | 03-140921 | 6/1991 |
| JP | 05-061039 | 3/1993 |
| JP | 06-186534 | 7/1994 |
| JP | 09-133810 | 5/1997 |

* cited by examiner

Primary Examiner—Toan Ton
(74) Attorney, Agent, or Firm—Sughrue Mion, PLLC

(57) ABSTRACT

A wide viewing angle polarizer having: a polarizing film; and a phase retarder adhesively laminated on at least one surface of the polarizing film through an adhesive layer, the phase retarder being made of a composite phase retarder constituted by a laminate in which a retardation layer B of a cholesteric liquid crystal-oriented solidified layer in a selective reflection wavelength range of not larger than 350 nm is supported by a retardation layer A of a thermoplastic resin exhibiting positive birefringence, the composite phase retarder being formed so that the laminate has Re of not smaller than 10 nm and Rth–Re of not smaller than 50 nm when Re and Rth are defined as Re=(nx−ny)X d and Rth=(nx−nz)X d respectively in which nx and ny are in-plane main refractive indices, nz is a thicknesswise refractive index, and d is a layer thickness. A liquid-crystal display device having: a liquid-crystal cell; and a wide viewing angle polarizer defined above and disposed on at least one surface of the liquid-crystal cell.

4 Claims, 1 Drawing Sheet

WIDE VIEWING ANGLE POLARIZER AND LIQUID-CRYSTAL DISPLAY DEVICE

The present application is based on Japanese Patent Application No. 2001-312162, which is incorporated herein by reference.

BACKGROUND OF THE INVENTION

1. Field of the Invention

The present invention relates to a wide viewing angle polarizer adapted for improvement in viewing angle characteristic of a liquid-crystal display device such as a vertical aligned (VA) liquid-crystal display device.

2. Description of the Related Art

To form a liquid-crystal display device exhibiting excellent display quality in all azimuths by compensation for birefringence of a liquid-crystal cell achieving display through a polarizer, the polarizer needs to be combined with a phase retarder in which main refractive indices nx, ny and nz in three directions, that is, two in-plane directions x and y in association an obliquely viewing direction and one normal direction z, are controlled. Particularly in a VA or OCB liquid-crystal display device, the polarizer needs to be combined with a phase retarder in which the main refractive indices in the three directions satisfy the relation nx>ny >nz.

As the phase retarder with controlled nx, ny and nz used in combination with the polarizer, there is heretofore known a phase retarder made from uniaxially stretched films laminated so that in-plane slow axis directions are perpendicular to each other or a monolayer phase retarder formed from a high-molecular film laterally or biaxially stretched by a tenter. Each of these phase retarders is bonded to a polarizer having a transparent protective layer such as a triacetyl cellulose film through an adhesive layer to thereby form an object.

Use of the former phase retarder, however, brings about a problem that the volume of the phase retarder is large because of use of two retardation films. On the other hand, the range of retardation value obtained in the latter monolayer phase retarder is narrow. In the case where the latter monolayer phase retarder is used and retardation value in the direction of the thickness of the phase retarder is remarkably larger than that in the normal direction, two or more phase retarders need to be laminated in the same manner as the former phase retarder in order to obtain the required retardation value. There arises still the problem that the volume of the phase retarder is large.

SUMMARY OF THE INVENTION

An object of the invention is to provide a phase retarder-containing polarizer which is excellent in reduction in thickness and which can be used for forming a liquid-crystal display device such as a VA liquid-crystal display device improved in viewing angle characteristic and high in contrast.

According to the invention, there is provided a wide viewing angle polarizer having: a polarizing film; and a phase retarder adhesively laminated on at least one surface of the polarizing film through an adhesive layer, the phase retarder being made of a composite phase retarder constituted by a laminate in which a retardation layer B of a cholesteric liquid crystal-oriented solidified layer in a selective reflection wavelength range of not larger than 350 nm is supported by a retardation layer A of a thermoplastic resin exhibiting positive birefringence, the composite phase retarder being formed so that the laminate has Re of not smaller than 10 nm and Rth−Re of not smaller than 50 nm on the basis of light at a wavelength of 590 nm when Re and Rth are defined as Re=(nx−ny)X d and Rth=(nx−nz)X d respectively in which nx and ny are in-plane main refractive indices, nz is a thicknesswise refractive index, and d is a layer thickness. There is also provided a liquid-crystal display device having: a liquid-crystal cell; and a wide viewing angle polarizer defined above and disposed on at least one surface of the liquid-crystal cell.

According to the invention, the retardation layer B is excellent in reduction in thickness because it is made of a liquid-crystal coating film. Moreover, because the retardation layer B is supported by the retardation layer A, a high-quality composite phase retarder excellent in reduction in thickness can be obtained. Moreover, because the composite phase retarder is bonded to a polarizing film so as to serve as a transparent protective layer, a separate transparent protective layer to be bonded to the polarizing film can be omitted. Hence, greater reduction in thickness can be achieved. When the combination of the composite phase retarder and the polarizing film is used, the viewing angle of the liquid-crystal cell can be improved extremely.

Features and advantages of the invention will be evident from the following detailed description of the preferred embodiments described in conjunction with the attached drawings.

DETAILED DESCRIPTION OF THE PREFERRED EMBODIMENTS

Figure 1:
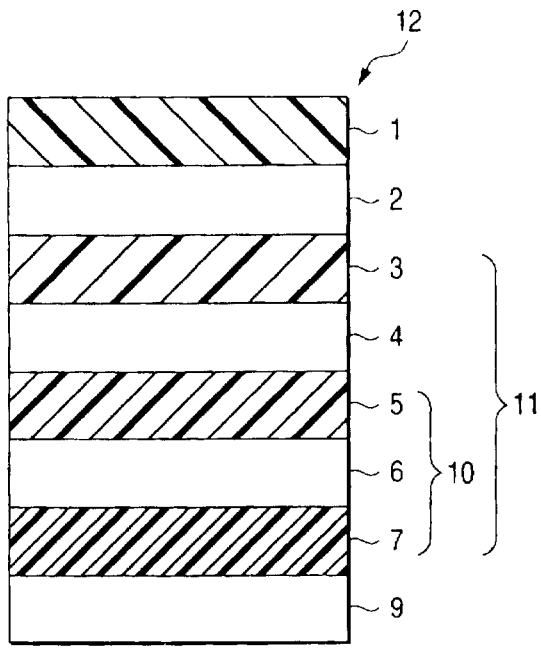
FIG. 1 is a sectional view for explaining an embodiment.

The wide viewing angle polarizer according to the invention has: a polarizing film; and a phase retarder adhesively laminated on at least one surface of the polarizing film through an adhesive layer. The phase retarder is made of a composite phase retarder constituted by a laminate in which a retardation layer B (second retardation layer) of a cholesteric liquid crystal-oriented solidified layer in a selective reflection wavelength range of not larger than 350 nm is supported by a retardation layer A (first retardation layer) of a thermoplastic resin exhibiting positive birefringence. The composite phase retarder is formed so that the laminate has Re of not smaller than 10 nm and Rth−Re of not smaller than 50 nm on the basis of light at a wavelength of 590 nm when Re and Rth are defined as Re=(nx−ny)X d and Rth=(nx−nz)X d respectively in which nx and ny are in-plane main refractive indices, nz is a thicknesswise refractive index, and d is a layer thickness. Hereupon, nx is an in-plane refractive index in the direction in which the in-plane refractive index becomes maximum within the plane of the plate, and ny is an in-plane refractive index in the direction orthogonal to the direction of nx.

Examples of the wide viewing angle polarizer 11 are shown in FIGS. 1 to 4. In FIGS. 1 to 4, the reference numeral 3 designates a polarizing film; 4, an adhesive layer; 5, a retardation layer A; and 7, a retardation layer B. Incidentally, the reference numeral 1 designates a transparent protective layer; 2 and 6, adhesive layers; and 8, an oriented film.

The retardation layer A, which is one of constituent members of the composite phase retarder 10, is made of a thermoplastic resin exhibiting positive birefringence. That is, the retardation layer A is made of a thermoplastic resin exhibiting characteristic of na>nb in which na is a refractive index in a stretching direction and nb is a refractive index in an in-plane direction perpendicular to the stretching direction when a film of the resin is stretched uniaxially.

The thermoplastic resin is not particularly limited. Any suitable transparent resin exhibiting positive birefringence can be used as the thermoplastic resin. Examples of the thermoplastic resin include polycarbonate, polyallylate, polysulfone, polyolefin, polyethylene terephthalate, polyethylene naphthalate, norbornene-based polymer, cellulose-based polymer, and mixture polymer of two or three or more kinds of polymers selected from the aforementioned polymers. Particularly, a resin excellent in birefringence controllability, transparency and heat resistance is used preferably.

The retardation layer A can be formed in such a manner that a film of the thermoplastic resin produced by a suitable method such as an extrusion molding method or a cast film-forming method is stretched by a method such as a vertical stretching method using a roll or a lateral or biaxial stretching method using a tenter. The stretching temperature is preferably selected to be near the glass transition temperature (Tg) of the film as a subject of treatment. Particularly, the stretching temperature is preferably selected to be not lower than Tg and lower than the melting point of the film.

In the vertical stretching method using a roll, there can be used a suitable heating method such as a method using a heating roll, a method of heating an atmosphere or a method using the aforementioned methods in combination. In the biaxial stretching method using a tenter, there can be used a suitable method such as a simultaneous biaxial stretching method using a whole tenter technique or a sequential biaxial stretching method using a roll-tenter technique. A layer little in variation in orientation and retardation is preferably used as the retardation layer A. The thickness of the retardation layer A can be decided suitably in accordance with retardation or the like. Generally, from the point of view of reduction in thickness, the thickness of the retardation layer A is selected to be in a range of from 1 to 300 μm, particularly in a range of from 10 to 200 μm, more particularly in a range of from 20 to 150 μm.

On the other hand, the retardation layer B, which is one of constituent members of the composite phase retarder, is formed as a solidified layer obtained in such a manner that cholesteric liquid crystal in a selective reflection wavelength range of not larger than 350 nm is oriented and then the oriented state is fixed. The thickness of the retardation layer B can be also decided suitably in accordance with retardation or the like. Generally, from the point of view of reduction in thickness, the thickness of the retardation layer B is selected to be not larger than 20 μm, particularly in a range of from 0.1 to 15 μm, more particularly in a range of from 0.5 to 10 μm.

The cholesteric liquid crystal in a selective reflection wavelength range of not larger than 350 nm is used for achieving bright display by not selectively reflecting light in a visible region but transmitting the light. That is, the cholesteric liquid crystal exhibits characteristic of selectively reflecting part of light at wavelengths near the central wavelength of incident light at a wavelength nc·P parallel to a spiral axis, as one of left- and right-hand circularly polarized light components when nc is the average refractive index and P is the spiral pitch on the basis of the spiral oriented state of the cholesteric liquid crystal. If the selective reflected light region appears in the visible region, the quantity of light allowed to be used for display is reduced disadvantageously. Therefore, the cholesteric liquid crystal is provided for preventing the quantity of light from being reduced.

As the cholesteric liquid crystal, there can be used a suitable one exhibiting the aforementioned selective reflecting characteristic as described in Unexamined Japanese Patent Publications No. Hei. 3-67219, 3-140921, 5-61039, 6-186534 and 9-133810, etc. From the point of view of stability of the oriented solidified layer, there can be preferably used a liquid-crystal material capable of forming a cholesteric liquid-crystal layer, such as a cholesteric liquid-crystal polymer, a chiral agent-containing nematic liquid-crystal polymer or a compound capable of forming the aforementioned liquid-crystal polymer by polymerization with light, heat or the like.

For example, the retardation layer B can be formed in such a manner that a support base material is coated with cholesteric liquid crystal. In this case, a method of wet-on-wet coating the support base material with one kind or different kinds of cholesteric liquid crystal may be used in accordance with necessity in order to control retardation. As the coating method, there can be used a suitable method such as a gravure coating method, a die coating method or a dipping method. The retardation layer A or any other suitable polymer film may be used as the support base material.

For the formation of the retardation layer B, a method for orienting liquid crystal may be used. The orienting method is not particularly limited. Any suitable method that can orient a liquid-crystal compound can be used. Incidentally, an example of the method is a method of orienting liquid crystal with which an oriented film is coated. Examples of the oriented film include: a rubbing-treated film of an organic compound such as a polymer; a rhombic vapor-deposited film of an inorganic compound; a film having a micro-groove; and a film obtained by accumulation of an LB film formed from an organic compound such as dioctadecyl methyl ammonium chloride or methyl stearate by the Langmuir-Blodgett technique.

Further, an oriented film capable of generating an orienting function when irradiated with light maybe used. On the other hand, a method of orienting liquid crystal with which a stretched film is coated (Unexamined Japanese Patent Publication No. Hei. 3-9325) or a method of orienting liquid crystal under application of an electric field, a magnetic field or the like may be used. Incidentally, it is preferable that the oriented state of liquid crystal is as uniform as possible. It is also preferable that liquid crystal is provided as a solidified layer in which the oriented state is fixed.

Figure 2:
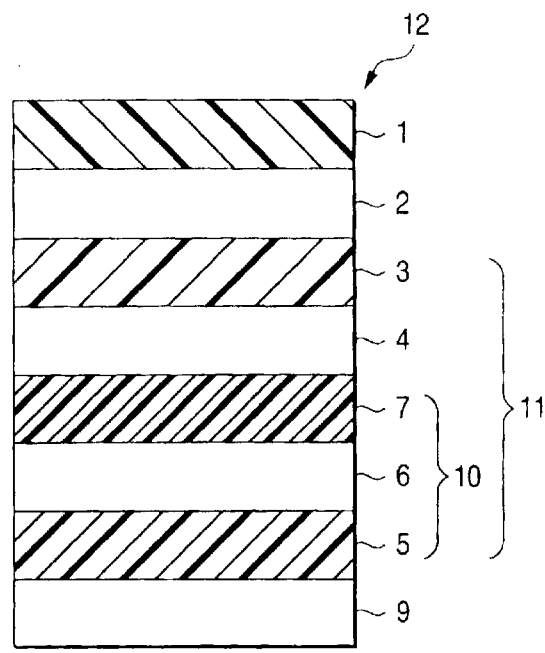
FIG. 2 is a sectional view for explaining another embodiment.

The composite phase retarder is formed in such a manner that the retardation layer B is supported by the retardation layer A in order to achieve reduction in thickness. For example, as shown in FIGS. 1 and 2, the composite phase retarder is formed by a method in which a coating liquid layer or a coating film provided on a support base material to form the retardation layer B 7 is transferred and bonded onto the retardation layer A 5 through an adhesive layer 6 as occasion demands. For example, the transfer can be performed by a method including the steps of: forming the retardation layer B on a releasant-treated surface provided on the support base material; providing an adhesive layer on the retardation layer B as occasion demands; laminating the retardation layer A on the retardation layer B; and separating the support base material through the releasant-treated surface.

Figure 3:
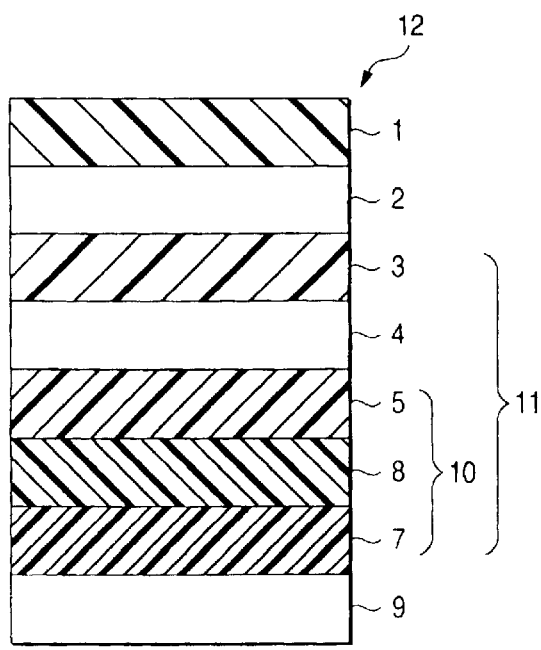
FIG. 3 is a sectional view for explaining a further embodiment.
Figure 4:
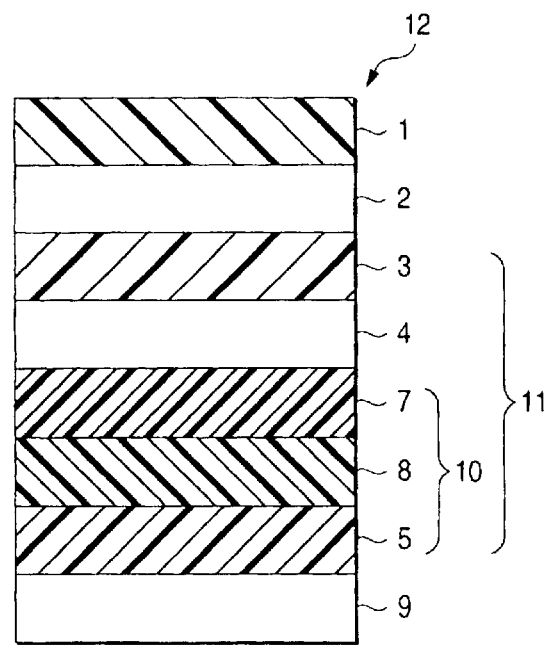
FIG. 4 is a sectional view for explaining a still further embodiment.

On the other hand, as shown in FIGS. 3 and 4, the composite phase retarder in which the retardation layer B is supported by the retardation layer A can be also formed by a method including the steps of: providing the oriented film such as a rubbing film 8 on a surface of the retardation layer A 5 serving as one of constituent members of the composite phase retarder, as occasion demands; and orienting and fixing a cholesteric liquid-crystal layer on the oriented film. This method is particularly preferred from the point of view of reduction in thickness.

The composite phase retarder is formed as a laminate exhibiting retardation characteristic in which Re is not smaller than 10 nm, particularly in a range of from 20 to 1000 nm, more particularly in a range of from 25 to 500 nm and Rth–Re is not smaller than 50 nm, particularly in a range of from 70 to 1500 nm, more particularly in a range of from 100 to 800 nm, on the basis of light at a wavelength of 590 nm (this condition applies hereunder) when Re and Rth are defined as Re=(nx−ny)X d and Rth=(nx−nz)X d in which nx and ny are in-plane main refractive indices (in directions of slow and fast axes), nz is a thicknesswise refractive index, and d is a layer thickness.

The provision of the composite phase retarder exhibiting the retardation characteristic can compensate for birefringence of any kind of liquid-crystal cell such as a VA liquid-crystal cell or an OCB liquid-crystal cell and can be used for forming a liquid-crystal display device excellent in viewing angle and contrast. For example, the composite phase retarder exhibiting the retardation characteristic can be obtained by a method using the retardation layer A having Re of 20 to 300 nm and Rh/Re of 1.0 to 50 and the retardation layer B having Re of 0 to 20 nm and Rh of 30 to 500 nm.

The wide viewing angle polarizer can be formed in such a manner that the composite phase retarder is adhesively laminated on one or each of opposite surfaces of the polarizing film 3 as shown in FIGS. 1 to 4. As the polarizing film, it is possible to use a suitable one in accordance with the related art without any particular limitation. For example, it is possible to use a polarizing film produced by the steps of: adsorbing a dichroic substance constituted by iodine and/or a dichroic dye such as an azo dye, an anthraquinone dye or a tetrazine dye onto a film made of a hydrophilic polymer such as polyvinyl alcohol, partially formalized polyvinyl alcohol or partially saponified ethylene-vinyl acetate copolymer; and stretching and orienting the film. When the composite phase retarder is provided on only one surface of the polarizing film 3 as shown in FIGS. 1 to 4, a transparent protective layer made of a transparent film or the like may be provided on the other surface of the polarizing film 3 as occasion demands. A film excellent in isotropy such as a triacetyl cellulose film can be preferably used as the transparent protective layer.

The retardation layer adjacent to the polarizing film may be A or B as shown in FIGS. 1 to 4. The adhesive layer for bonding the composite phase retarder and the polarizing film to each other is provided to prevent the optical axis from being displaced and prevent an alien substance such as dust from entering. The adhesive agent for forming the adhesive layer is not particularly limited in kind. From the point of view of preventing the optical characteristic of constituent members from changing, it is preferable to use an adhesive agent not requiring any high-temperature process for curing and drying in a bonding treatment or an adhesive agent not requiring any long-term curing and drying process. From this point of view, a hydrophilic polymer-based adhesive agent or a pressure sensitive adhesive layer may be preferably used.

Incidentally, for the formation of the pressure sensitive adhesive layer, it is possible to use a transparent pressure sensitive adhesive agent using a suitable polymer such as acrylic-based polymer, silicone-based polymer, polyester, polyurethane, polyether or synthetic rubber. Particularly, an acrylic-based pressure sensitive adhesive agent is preferred from the point of view of optical transparency, pressure sensitive adhesion, weather resistance, and so on.

Incidentally, the pressure sensitive adhesive layer may be provided on one or each of opposite surfaces of the wide viewing angle polarizer as occasion demands in order to bond the wide viewing angle polarizer to a subject such as a liquid-crystal cell. In this cases if the pressure sensitive adhesive layer is exposed, the pressure sensitive adhesive layer is preferably temporarily covered with a separator or the like so that a surface of the pressure sensitive adhesive layer can be prevented from being contaminated with an alien substance before the pressure sensitive adhesive layer is put into practical use.

The wide viewing angle polarizer may be formed to have at least one suitable functional layer on one or each of its opposite surfaces. Examples of the functional layer include: a protective layer similar to the transparent protective layer for various kinds of purposes such as water resistance; and an anti-reflection layer or/and an anti-glare layer for the purpose of preventing surface reflection or the like. The anti-reflection layer can be formed suitably as a light-coherent film such as a fluorine-based polymer coat layer or a multilayer metal-deposited film. The anti-glare layer can be also formed as a resin coating layer containing fine particles or by a suitable method in which a fine prismatic structure is provided on a surface by a suitable method such as embossing, sandblasting or etching to thereby diffuse surface-reflected light.

Incidentally, examples of the fine particles include inorganic fine particles and organic fine particles with a mean particle size of from 0.5 to 20 μm. The inorganic fine particles are made of silica, calcium oxide, alumina, titania, zirconia, tin oxide, indium oxide, cadmium oxide, antimony oxide, etc. and may be electrically conductive. The organic fine particles are crosslinked or non-crosslinked fine particles made of suitable polymers such as polymethyl methacrylate and polyurethane. One member or a combination of two or more members suitably selected from the inorganic fine particles and the organic fine particles may be used as the fine particles. Incidentally, the adhesive layer or pressure sensitive adhesive layer may contain such fine particles so as to exhibit light-diffusing characteristic.

The wide viewing angle polarizer according to the invention can be used for suitable purposes such as formation of a liquid-crystal display device 12. Particularly, the wide viewing angle polarizer can be preferably used for optical compensation of a liquid-crystal cell 9. The liquid-crystal display device can be formed by arrangement of the wide viewing angle polarizer on one or each of opposite surfaces of the liquid-crystal cell. In this case, either of the composite phase retarder and the polarizing film may be disposed on the liquid-crystal cell side. Incidentally, for the formation of the liquid-crystal display device, suitable optical elements such as a light-diffusing plate, a backlight unit, a light-condensing sheet or a reflecting plate may be disposed as occasion demands.

EXAMPLE 1

A polyester film (PET) was vertically stretched through a heating roll to thereby obtain a retardation layer A having Re of 40 nm, Rth of 41 nm and a thickness of 60 µm.

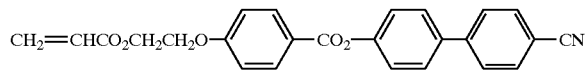

On the other hand, a nematic liquid-crystal compound represented by the aforementioned formula and a chiral agent represented by the following formula were mixed with each other to set a selective reflection wavelength to be in a range of from 290 to 310 nm. A cholesteric liquid-crystal solution obtained by adding a photo-polymerization initiator to the mixture was applied on a biaxially stretched PET film, heated at 80° C. for 3 minutes and then crosslinked by irradiation with ultraviolet rays to thereby obtain a retardation layer B having a thickness of 1.9 µm, Re of 2 nm and Rth of 132 nm. The retardation layer B was laminated on the retardation layer A through an acrylic-based pressure sensitive adhesive layer having a thickness of 15 µm. The biaxially stretched PET film was separated to thereby obtain a composite phase retarder having Re of 42 nm and Rth of 173 nm.

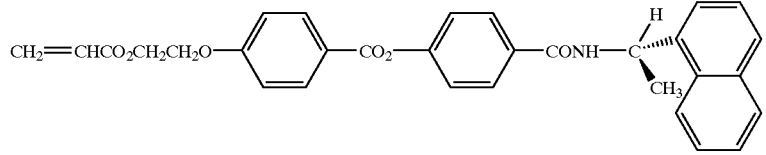

Then, a polyvinyl alcohol film 80 µm thick was stretched by five times in an iodine aqueous solution to thereby obtain a polarizing film. A triacetyl cellulose film 80 µm thick was bonded to one surface of the polarizing film through an acrylic-based pressure sensitive adhesive layer. The composite phase retarder was bonded to the other surface of the polarizing film through a pressure sensitive adhesive layer so that the retardation layer A faced inward. Thus, a wide viewing angle polarizer having a total thickness of 210 µm was obtained.

EXAMPLE 2

A wide viewing angle polarizer was obtained in the same manner as in Example 1 except that the composite phase retarder with the retardation layers A and B inverted to each other in location was disposed so that the retardation layer B faced inward.

EXAMPLE 3

A composite phase retarder having Re of 41 nm and Rth of 173 nm and a wide viewing angle polarizer having a total thickness of 231 µm were obtained in the same manner as in Example 1 except that the retardation layer A was made of a norbornene resin film laterally stretched by a tenter and having Re of 40 nm, Rth of 102 nm and a thickness of 85 µm whereas the retardation layer B was formed to have a thickness of 1.0 µm, Re of 1 nm and Rth of 71 nm.

EXAMPLE 4

A wide viewing angle polarizer was obtained in the same manner as in Example 3 except that the composite phase retarder with the retardation layers A and B inverted to each other in location was disposed so that the retardation layer B faced inward.

EXAMPLE 5

A triacetyl cellulose film was laterally stretched by a tenter to thereby obtain a retardation layer A having Re of 38 nm, Rth of 65 nm and a thickness of 49 µm. A solution containing 1% by weight of polyvinyl alcohol was applied on the retardation layer A and dried at 90° C. to thereby form a coating film about 0.01 µm thick. A surface of the coating film was rubbing-treated to form an oriented film. Then, a cholesteric liquid-crystal solution the same as in Example 1 was applied on the oriented film, heated at 90° C. for 1 minute and crosslinked by irradiation with ultraviolet rays to form a retardation layer B having a thickness of 1.5 µm, Re of 2 nm and Rth of 106 nm. In this manner, a composite phase retarder having Re of 40 nm and Rth of 171 nm was obtained. A wide viewing angle polarizer having a total thickness of 166 µm was obtained in the same manner as in Example 1 except that the composite phase retarder obtained thus was used. Incidentally, the triacetyl cellulose film was bonded through a polyvinyl alcohol adhesive layer 5 µm thick.

EXAMPLE 6

A wide viewing angle polarizer was obtained in the same manner as in Example 5 except that the composite phase retarder with the retardation layers A and B inverted to each other in location was disposed so that the retardation layer B faced inward.

Comparative Example

A polarizer obtained by bonding triacetyl cellulose films onto opposite surfaces of a polarizing film obtained in Example 1 was used singly.

Evaluation Test (Wide viewing angle) polarizers obtained in each of Examples and Comparative Example were disposed on opposite surfaces of a VA liquid-crystal cell in the form of crossed-Nicol to thereby obtain a liquid-crystal display device. A viewing angle exhibiting contrast of not lower than 10 was measured in each of an up-and-down direction, a left-and-right direction, a direction of diagonal 1 (45° and −225°) and a direction of diagonal 2 (135° and 315°). Incidentally, the composite phase retarder was disposed on the cell side in Examples 1 and 2 whereas the polarizing film was disposed on the cell side in the other Examples.

Results of the measurement were as shown in Table.

|  | Viewing Angle | | | |
| --- | --- | --- | --- | --- |
|  | Up-Down | Left-Right | Diagonal 1 | Diagonal 2 |
| Example 1 | ±80 | ±80 | ±65 | ±65 |
| Example 2 | ±80 | ±80 | ±65 | ±65 |
| Example 3 | ±80 | ±80 | ±60 | ±60 |
| Example 4 | ±80 | ±80 | ±60 | ±60 |
| Example 5 | ±80 | ±80 | ±65 | ±65 |
| Example 6 | ±80 | ±80 | ±65 | ±65 |
| Comparative Example | ±40 | ±40 | ±30 | ±30 |

It is obvious from Table that the viewing angle exhibiting high contrast is widened in Examples. It is obvious from the above description that a wide viewing angle polarizer which can be used for forming a liquid-crystal display device thin in thickness, light in weight, excellent in productivity and visibility and high in display quantity is obtained according to the invention.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A wide viewing angle polarizer comprising:

a polarizing film; and a phase retarder adhesively laminated on at least one surface of said polarizing film through an adhesive layer, said phase retarder being made of a composite phase retarder constituted by a laminate in which a second retardation layer of a cholesteric liquid crystal-oriented solidified layer in a selective reflection wavelength range of not larger than 350 nm is supported by a first retardation layer of a thermoplastic resin exhibiting positive birefringence, said composite phase retarder being formed so that said laminate has Re of not smaller than 10 nm and Rth−Re of not smaller than 50 nm on the basis of light at a wavelength of 590 nm when Re and Rth are defined as Re=(nx−ny)X d and Rth=(nx−nz)X d respectively in which nx and ny are in-plane main refractive indices, nz is a thicknesswise refractive index, and d is a layer thickness.

2. A wide viewing angle polarizer according to claim 1, wherein said first retardation layer in said composite phase retarder has Re of 20 to 300 nm and Rth/Re of not smaller than 1.0 whereas said second retardation layer in said composite phase retarder has Re of 0 to 20 nm and Rth/Re of 30 to 500 nm.

3. A wide viewing angle polarizer according to claim 1, wherein a pressure sensitive adhesive layer is provided on at least one of opposite surfaces of said wide viewing angle polarizer.

4. A liquid-crystal display device comprising:

a liquid-crystal cell; and a wide viewing angle polarizer according to claim 1 and disposed on at least one surface of said liquid-crystal cell.

* * * * *